US012238749B2

(12) United States Patent
Martinez et al.

(10) Patent No.: US 12,238,749 B2
(45) Date of Patent: Feb. 25, 2025

(54) APPARATUSES AND METHODS INVOLVING COMMUNICATIONS UTILIZING DIFFERENT PROTOCOLS IN A COMMON CHANNEL

(71) Applicant: NXP B.V., Eindhoven (NL)

(72) Inventors: Vincent Pierre Martinez, Venerque (FR); Cornelis Marinus Moerman, Waalre (NL); Rui Cao, Sunnyvale, CA (US)

(73) Assignee: NXP B.V., Eindhoven (NL)

( * ) Notice: Subject to any disclaimer, the term of this patent is extended or adjusted under 35 U.S.C. 154(b) by 268 days.

(21) Appl. No.: 17/658,451

(22) Filed: Apr. 8, 2022

(65) Prior Publication Data

US 2022/0353868 A1 Nov. 3, 2022

(30) Foreign Application Priority Data

Apr. 29, 2021 (EP) .................... 21305552

(51) Int. Cl.
*H04W 72/53* (2023.01)
*H04L 69/08* (2022.01)
*H04W 4/40* (2018.01)
*H04W 84/12* (2009.01)

(52) U.S. Cl.
CPC ............. *H04W 72/53* (2023.01); *H04L 69/08* (2013.01); *H04W 4/40* (2018.02); *H04W 84/12* (2013.01)

(58) Field of Classification Search
CPC ........ H04L 69/08; H04W 4/40; H04W 72/53; H04W 84/12
See application file for complete search history.

(56) References Cited

U.S. PATENT DOCUMENTS

| | | |
|---|---|---|
| 10,959,073 B2 | 3/2021 | Martinez |
| 2017/0257201 A1 | 9/2017 | Eitan et al. |
| 2018/0014146 A1 | 1/2018 | Gulati et al. |
| 2020/0008026 A1 | 1/2020 | Martinez |
| 2020/0296187 A1* | 9/2020 | Sabella ................. H04L 67/12 |
| 2022/0287083 A1* | 9/2022 | Gomes Baltar ......... H04W 4/40 |

OTHER PUBLICATIONS

Kapsch Trafficcom AG., "Co-channel coexistence method for ITS-G5 and other technologies", ETSI-ERMTG37(18)000025r1, 5 pgs., Submitted Jun. 10, 2018.
Moerman et al., "How Re-Allocating the 5.9 GHz Band Could Affect Road Safety, DSRC. C-V2X and implications of the proposed spectrum changes", NXP B.V., Doc. No. V2XFCCWP Rev 0, 6 pgs (2020).
Fishel, Alan G., "Ex Parte Notice of Jun. 18, 2020 Meeting with Umair Javed", Jun. 19, 2020, 13 pages.

* cited by examiner

*Primary Examiner* — Brian P Cox

(57) ABSTRACT

Aspects of the present disclosure are directed to communicating signals to receivers utilizing different protocols. As may be implemented in accordance with one or more embodiments, a set of signals are generated to include data configured in accordance with a first protocol and data configured in accordance with a second protocol. The set of signals are communicated over the wireless channel, by using the data corresponding to the first protocol for communicating with receivers operating in accordance with the first protocol and using the data corresponding to the second protocol to communicate with receivers operating in accordance with the second protocol.

20 Claims, 5 Drawing Sheets

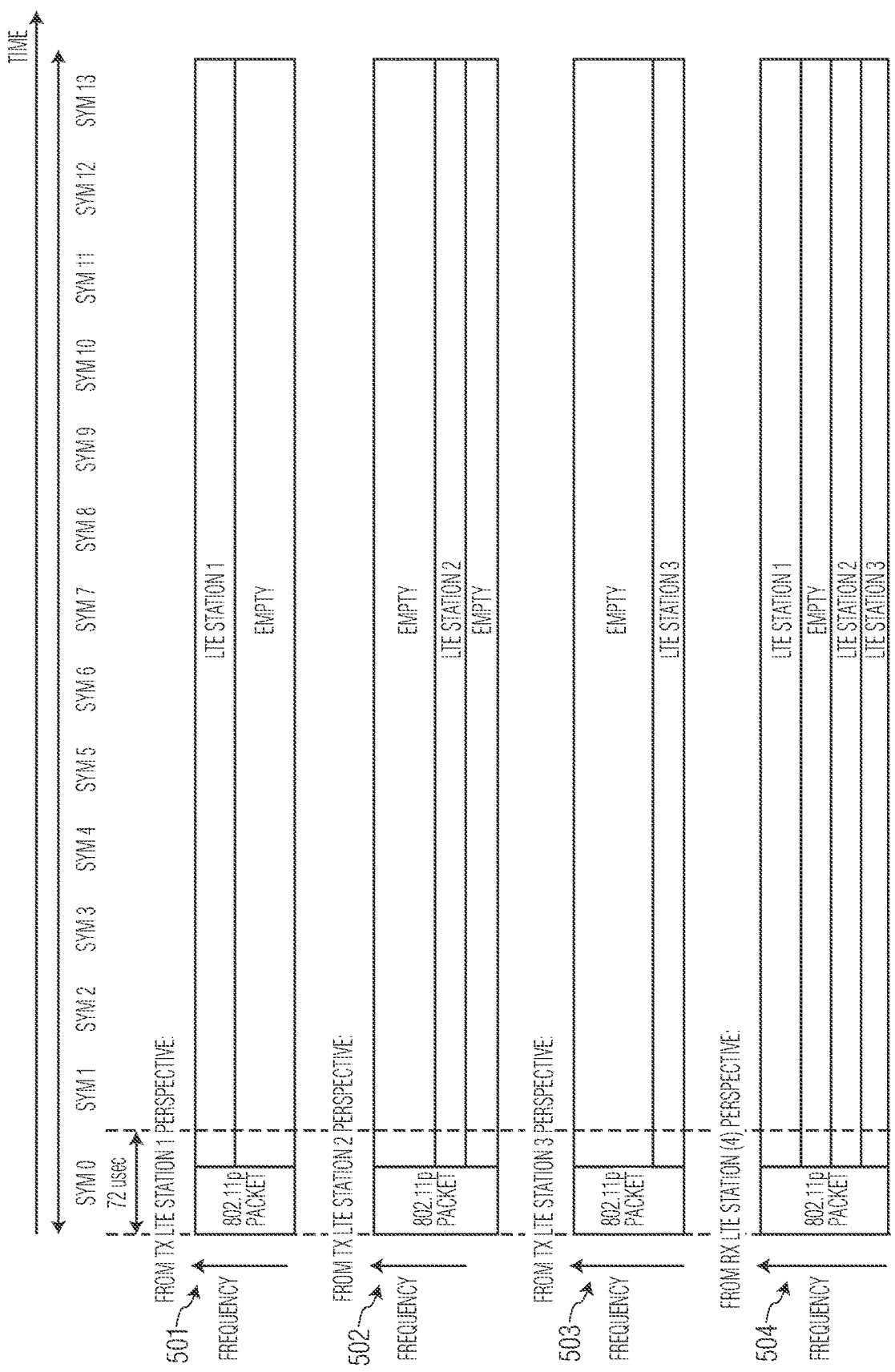

ically utilized by several standards. Such
APPARATUSES AND METHODS INVOLVING COMMUNICATIONS UTILIZING DIFFERENT PROTOCOLS IN A COMMON CHANNEL

CROSS-REFERENCE TO RELATED APPLICATIONS

This application claims the priority under 35 U.S.C. § 119 of European Patent application no. 21305552.8, filed on 29 Apr. 2021, the contents of which are incorporated by reference herein.

OVERVIEW

Aspects of various embodiments are directed to generation and communication of signals including data configured in accordance with different protocols. Various communications protocols are utilized for communicating different types of wireless signals. In some instances, stations, receivers or other circuitry may coexist in a common environment, and may attempt to utilize common channels. Spectrum sharing can be necessary, yet spectrum space may be scarce and desirably used by several standards. For instance, available bandwidth may be allocated in chunks to particular standards, which may limit use by other standards. Such standards may include, for example, Vehicle-to-Everything (V2X), Cellular-V2X (C-V2X), Wi-Fi, and others. These and other matters have presented challenges to efficiencies and implementations of wireless communications, for a variety of applications.

SUMMARY

Various example embodiments are directed to issues such as those addressed above and/or others which may become apparent from the following disclosure concerning the communication of signals on a common channel utilized by receivers operating on different protocols. Such aspects may include generating and communicating signals including data configured in accordance with each of the different protocols.

In certain example embodiments, aspects of the present disclosure involve inserting a data set of a first protocol into a signal of the second protocol as may be intended for receivers of the second protocol. This may facilitate receipt of the communication at receivers of the first protocol and communication therewith (e.g., instructing to vacate the channel). Such an approach may involve inserting a Wi-Fi-based data into a C-V2X message.

In a more specific example embodiment, an apparatus comprises communication circuitry configured to communicate signals over a wireless channel according to a first protocol, and logic circuitry. The logic circuitry is configured and arranged with the communication circuitry to generate a set of signals including data configured in accordance with the first protocol and including data configured in accordance with a second protocol, and to communicate the set of signals over the wireless channel, using the data corresponding to the first protocol for communicating with receivers operating in accordance with the first protocol.

Another specific example embodiment is directed to a method as follows. A set of signals is generated, the set of signals including data configured in accordance with a first protocol and data configured in accordance with a second protocol. The set of signals is communicated over a wireless channel, using the data corresponding to the first protocol to communicate with receivers operating in accordance with the first protocol and using the data corresponding to the second protocol to communicate with receivers operating in accordance with the second protocol.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawings, in which:

FIG. 5 shows a multiple-user LTE-V2X subframe view, as may be implemented in accordance with the present disclosure.

Figure 1:
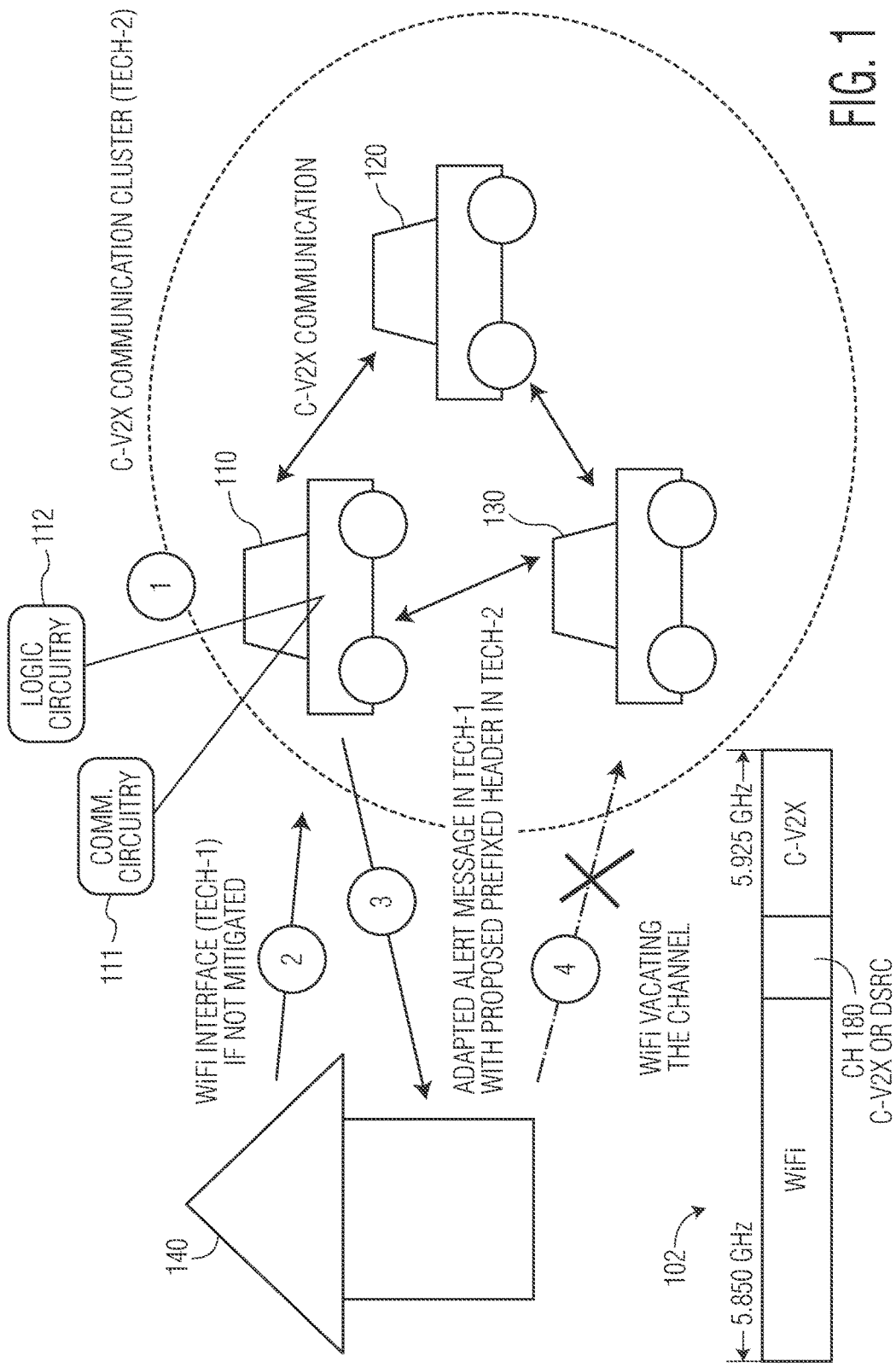
FIG. 1 shows a system and apparatuses for communicating in an environment involving receivers operating on disparate protocols, in accordance with the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving the communication of different types of signals in a common channel. In certain implementations, aspects of the present disclosure have been shown to be beneficial when used in the context of V2X communications (such as Cellular-V2X communications (C-V2X)) with a spectrum shared with Wi-Fi communications. In some embodiments, a communication station may insert a Wi-Fi data set into a C-V2X communication to facilitate receipt of the communication by Wi-Fi receivers, while providing the bulk of the communication as a C-V2X communication to C-V2X receivers. This may further facilitate instructing the Wi-Fi receivers to vacate the channel for what may be higher-priority C-V2X communications. As such, various aspects of the disclosure address C-V2X detection by an IEEE802.11 device, via insertion of a decodable DSRC (dedicated short-range communications) data set within C-V2X communications. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

As used herein, the term or "data set" for a particular protocol in the context of insertion thereof into a communication utilizing another protocol (e.g., C-V2X) refers to data that enables receivers of the particular protocol to receive and decode that data set. A remaining portion of the communication may be utilized for the other protocol. For instance, a Wi-Fi data set may be inserted into a C-V2X communication and include sufficient information for a Wi-Fi receiver that, when decoded, may instruct the Wi-Fi receiver to vacate the channel. In some contexts, this data set may thus operate as a channel reservation token or token, which acts to cause receivers of that protocol to vacate or reserve the channel for the other protocol. Such a channel reservation token may be a full or partial message containing sufficient information encoded in a first protocol such that systems using the first protocol infer characteristics of systems using a second protocol, and take appropriate actions (e.g. vacate the channel for a predetermined time duration). In a more specific example embodiment, in case the first protocol is IEEE802.11p and the second protocol is C-V2X, the token (or data set) may comprise IEEE 802.11p preamble (L-STF and L-LTF) and a Signal Field (L-SIG) sections, followed or not by a partial or full L-DATA section, followed or not by padding to fill a complete OFDM symbol worth of time. In another more specific example embodiment, such a data set, or token, acts as a channel reservation message for stations transmitting messages. The reservation information can be encoded using a Signal Field duration (e.g., forcing the stations pertaining to a first protocol to stay in receive mode for a predefined time duration, such as 10 ms), or by setting specific fields in the MAC header (e.g., setting the IEEE 802.11 OCB (Outside the Context of a Basic Service Set identifier) flag (dot11OCBActivated)).

Various aspects of the disclosure are directed to modifying signals of a protocol such as a C-V2X messages waveform, so that it includes a data set of another protocol such as an IEEE 802.11p/bd data set. When implemented, the included data set can be recognized by Wi-Fi devices as a valid V2X communication, for example due to the OCB field content. Such Wi-Fi device may thus take action upon its reception. The inserted data set may be relatively short, for instance such that it occupies less than 1 or 2 OFDM symbols worth of time, facilitating CV2X receiver performance. Further, such a CV2X receiver need not necessarily include IEEE 802.11 capabilities (e.g., as relating to the IEEE 802.11 standard, including releases up to and including IEEE 802.11-2020, which are incorporated herein by reference). As noted herein, the term C-V2X refers to LTE-V2X (long-term evolution V2X) and/or 5G NR V2X (fifth generation new radio V2X). However, the various approaches herein may be implemented similarly with other respective protocols, inserting a data set from one protocol into another to facilitate compatibility.

In some embodiments, the inserted data set is safely positioned within the 1st OFDM symbol of C-V2X messages, where the 1st symbol is not mandatory for proper reception by C-V2X receivers, which may be used for AGC calibration and settling purposes. As such, C-V2X communications are mostly unaffected. In other embodiments, the inserted data set overlaps the last OFDM symbol of a previous subframe and the first symbol of the subframe, where the last OFDM symbol of a subframe is otherwise empty. Where implemented with LTE-V2X OFDM symbols, the inserted data set may occupy about half of the $1^{st}$ of such symbols. These approaches thus may, for example, operate for communication with C-V2X devices such as modems that do not otherwise support for IEEE802.11p/bd detection. The inserted data set may be viewed as a LUT (lookup table) sequence that is patching regular C-V2X symbols obtained after encoding.

In some instances, the inserted data set can be prerecorded such that no additional computational effort is necessary. The inserted data set can be delivered to an upconverter by the same digital to analog converter as an LTE signal. The use of fixed prerecorded data set may facilitate use by several LTE-V2X users of the same subframe (e.g., frequency division multiplex), such that each transmit the same inserted data set information and therefore do not interfere with each other. In certain embodiments, a communication sequence as noted herein can be resampled offline to C-V2X rates to reduce/minimize DSP (digital signal processing) effort.

Various such aspects of the disclosure may further facilitate communications using disparate protocols such as C-V2X and IEEE802.11-based protocols, and related devices that are not equipped to decode headers of one or the other protocol. For instance, such protocols may utilize disparate sampling rates, or disparate network types such as asynchronous and synchronous networks.

Another embodiment is directed to an apparatus including communication circuitry and logic circuitry. The communication circuitry communicates signals according to a first protocol over a wireless channel, and operates with the logic circuitry to generate and communicate (e.g., in a single transmission) a set of signals including data configured in accordance with first and second protocols. Specifically, the set of signals may be communicated over the wireless channel using the data corresponding to the first protocol for communicating with receivers operating in accordance with the first protocol, and may use the data corresponding to the second protocol to communicate with receivers operating in accordance with the second protocol. This approach may, for example, be effected to modify a signal by inserting a data set of the first protocol into a signal of the second protocol intended for reception by receivers of the second protocol. Accordingly, receivers of the first protocol may receive and process the inserted data set, thus facilitating operation of both receivers in a common channel. Further, the inserted data set may be used to instruct receivers of the first protocol, such as to vacate the channel for higher priority communications of the second protocol.

In a specific implementation, the logic circuitry operates with the communication circuitry to communicate the set of signals by communicating C-V2X signals on the wireless channel using a C-V2X protocol with a valid a Wi-Fi data set. The Wi-Fi data set is utilized to facilitate communication of the set of signals on the wireless channel using a Wi-Fi signal protocol and to render a portion of the set of signals including the Wi-Fi data set decodable by receivers operating on the Wi-Fi signal protocol. For instance, a Wi-Fi data set may be inserted into a C-V2X signal such that Wi-Fi stations can receive and process the Wi-Fi portion. If desired, the Wi-Fi portion may be used to instruct Wi-Fi stations, such as to vacate the channel. For instance, if the Wi-Fi data set is a V2X data set, the receivers using the first protocol may respond by vacating the channel.

In some implementations, the logic circuitry may operate with the communication circuitry in respective modes, as noted above an in another mode in which signals are communicated with communication stations over a different communication channel utilizing the second protocol alone (without insertion of data corresponding to the first protocol).

The logic circuitry and communication circuitry may include, in communications using the second protocol, a data set configured in accordance with the first protocol. The data set may include information allowing receiver circuitry, which is configured to decode signals of the first protocol and unable to decode signals of the second protocol, to decode the data set configured in accordance with the first protocol and operate in accordance therewith. Such a data set may include information that directs the receiver circuitry to defer channel use to communications including data configured in accordance with the second protocol.

In some implementations, the logic circuitry generates a set of signals including data configured in accordance with the first protocol by retrieving a stored version of the data configured in accordance with the first protocol. This approach may be utilized for including the stored version of the data in multiple such communications. In some instances, versions of the same stored data are utilized by multiple communication circuits in a common environment.

In accordance with a method-based embodiment, a set of signals is generated to include data configured in accordance with a first protocol and data configured in accordance with a second protocol. The set of signals is communicated over a wireless channel, using the data corresponding to the first protocol to communicate with receivers operating in accordance with the first protocol, and using the data corresponding to the second protocol to communicate with receivers operating in accordance with the second protocol (e.g., in a single transmission). For instance, signals that are to be communicated using the second protocol may be modified to include a communication data set in accordance with the first protocol. This approach may thus facilitate communications of data corresponding to the second protocol with receivers operating using the second protocol, while maintaining compatibility of the same communication for communicating with receivers operating using the second protocol. In some instances, information of the first protocol that instructs receivers operating in accordance with the first protocol to vacate the channel is communicated as part of the set of signals, therein providing access to the channel for communicating the data corresponding to the second protocol.

Certain approaches may involve communicating C-V2X signals on a wireless channel using a C-V2X protocol with a valid a Wi-Fi data set. The Wi-Fi data set is utilized to facilitate communication of the set of signals on the wireless channel using a Wi-Fi signal protocol and to render a portion of the set of signals including the Wi-Fi data set decodable by receivers operating on the Wi-Fi signal protocol. The Wi-Fi data set may, for example, instruct Wi-Fi receivers to release the channel for a predefined amount of time for use by C-V2X communications.

In some instances, a particular transmitter may further communicate a set of signals consisting of data configured in accordance with the second protocol over a different communication channel, for communicating with receivers operating in accordance with the second protocol. Such an approach may facilitate communications in different environments that don't include stations configured to communicate with the first protocol.

In a particular embodiment, a data set configured in accordance with the first protocol is added to a communication configured in accordance with the second protocol. Such a data set may include information allowing receiver circuitry, which is configured to decode signals of the first protocol and unable to decode signals of the second protocol, to decode the data set configured in accordance with the first protocol and operate in accordance therewith. Further, the data set configured in accordance with the first protocol may include information that directs receivers operating in accordance with the first protocol to defer channel use to communications including data configured in accordance with the second protocol.

Turning now to the figures, FIG. 1 shows a system and apparatuses for communicating in an environment involving receivers operating on disparate protocols. A C-V2X communication cluster (denoted as tech-2) may include apparatuses 110, 120 and 130 shown by way of example as being located within respective vehicles. Each apparatus may include circuitry for effecting C-V2X communications, with apparatus 110 shown by way of example as having communication circuitry 111 and logic circuitry 112. Accordingly, C-V2X communications can be implemented in a shared bandwidth region as shown in 102, with a Wi-Fi portion thereof utilized with C-V2X by way of inclusion of a Wi-Fi data set as noted herein. One or more of these apparatuses may operation to communicate in accordance with one or more embodiments characterized herein.

Figure 2:
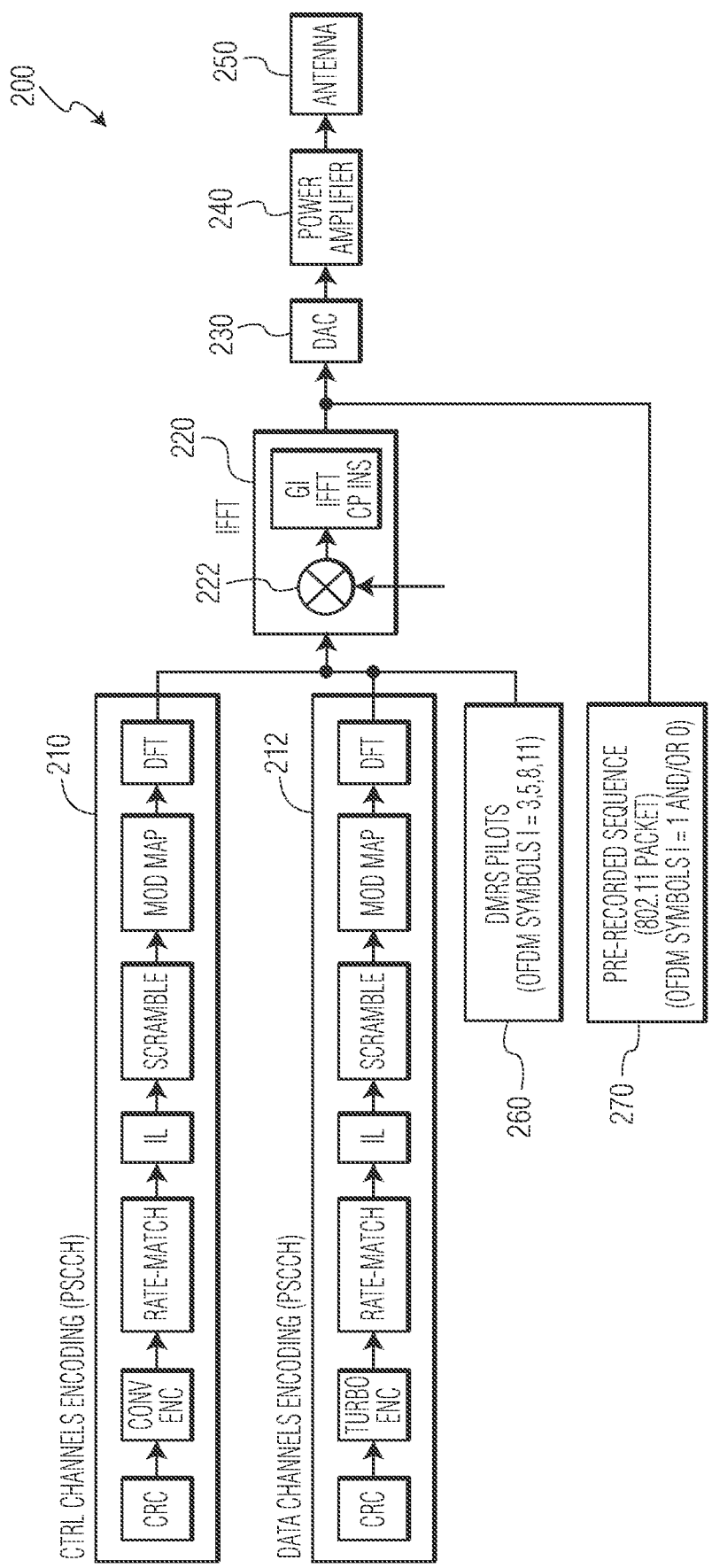
FIG. 2 is shows an LTE Sidelink transmitter (TX), as may be implemented in accordance with the present disclosure.

This cluster communicates in an environment that also includes a Wi-Fi communications device 140 (denoted as tech-1), which may act as interference if not mitigated. Accordingly, and referring to apparatus 110 by way of example, logic circuitry 112 inserts a Wi-Fi data set into a C-V2X communication, which is received by Wi-Fi communications device 140. As denoted at 3, the Wi-Fi data set may include an adapted alert message that causes the Wi-Fi device 140 to vacate the channel as denoted at 4. The same C-V2X communication can be made to the other apparatuses 120 and 130, which process the communications as denoted herein. For instance, where the Wi-Fi data set is included in a first symbol, the apparatuses 120 and 130 may process the C-V2X communication as otherwise normal. Data FIG. 2 shows an LTE Sidelink transmitter (TX) 200, as may be implemented in accordance with one or more embodiments. The transmitter 200 includes control channel encoding block 210 and data channel encoding block 212, which are combined at 222 within an inverse fast-Fourier transform (IFFT) block 220, the output of which is passed to a DAC 230, power amplifier 240 and antenna 250 for transmission. Block 260 provides DRMS pilots (OFDM symbols) to 222, and block 270 provides a prerecorded sequence for an IEEE 802.11 data set to be inserted into C-V2X communications, at or prior to the DAC 230. For instance, block 270 may utilize a look-up-table (LUT) for storing such a prerecorded sequence.

Figure 3:
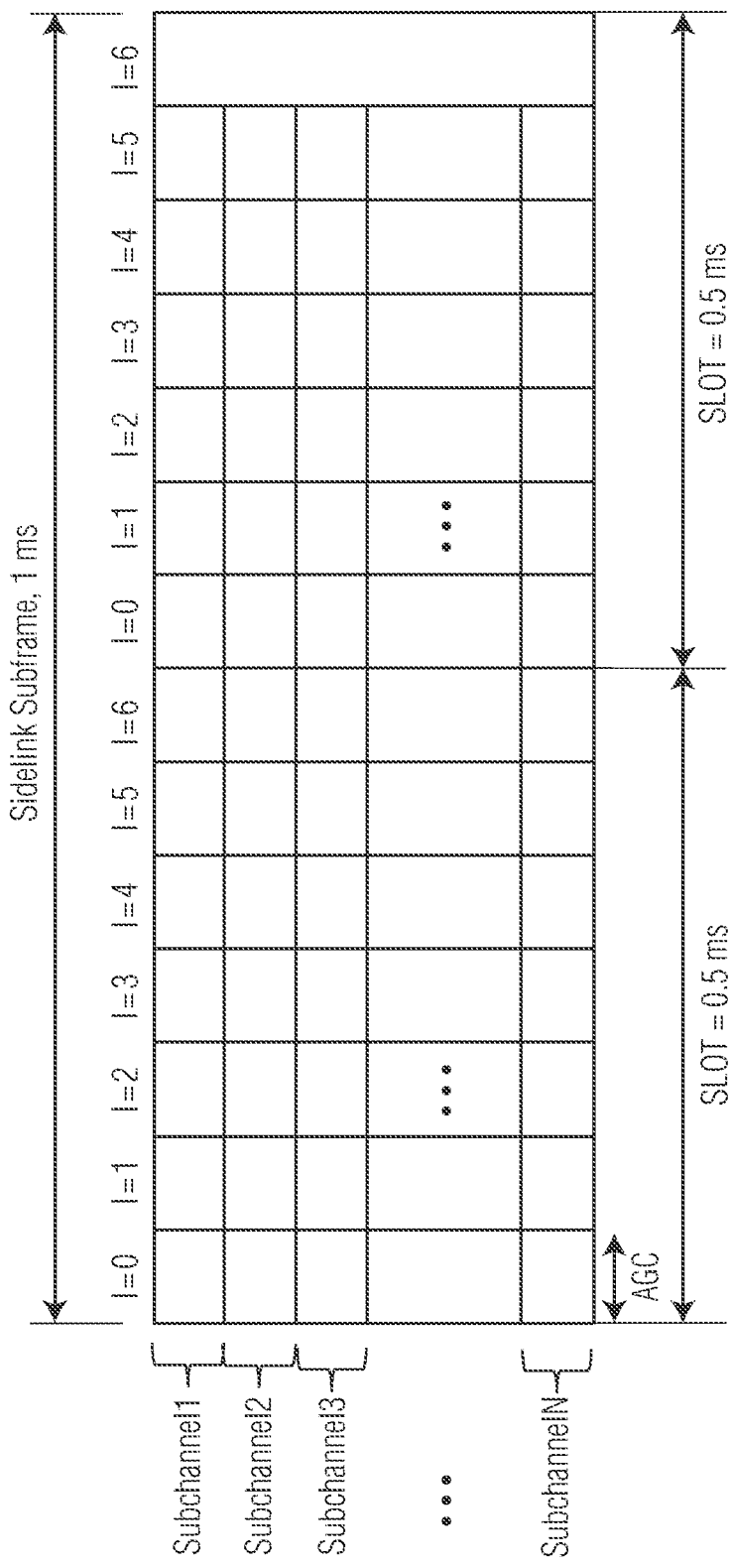
FIG. 3 shows LTE-V2X subframe organization, as may be implemented in accordance with the present disclosure.

FIG. 3 shows LTE-V2X subframe organization, with 14 OFDM symbols forming 1 subframe of 1 ms, as may be implemented in accordance with one or more embodiments. Notably, the approach shown in FIG. 3 may be implemented in the context of other communication types such as 5G-NR-V2X. The first symbol of messages sent via the LTE-V2X approach is modified to include a Wi-Fi data set, as may be implemented in accordance with one or more embodiments herein. This approach may leverage 3GPP V2X synchronous systems, such that users may be assumed to be synchronized on a common reference timing (e.g., GNSS).

The LTE-V2X messages last for 1 subframe (1 ms), meaning that from one subframe to the next subframe, there may be a different set of users, and a different received power energy. The receiver(s) adapt their AGC to avoid ADC saturation at each beginning of subframes. The 1st OFDM symbol may be one that is not made available for channel decoding at the receiver (e.g., as it might be lost in AGC calibration purposes), and may be used to teach receivers about the amplitude of the signal to come (subsequent OFDM symbols). As such, the content of the $1^{st}$ OFDM symbol may be modified in accordance with one or more embodiments, for instance such that it has the same amplitude as the subsequent OFDM symbol of the subframe.

The 1st OFDM symbol can be modified to hold an IEEE 802.11p data set at its beginning, that would be read and understood by the IEEE 802.11p users. The IEEE 802.11p data set may contain sections as follows:

1) L-SFT: "legacy short training field". Provides support of synchronization & AGC calibration. 16 μs;
2) L-LTF: "legacy long training field": provides channel estimation pilot for decoding the subsequent IEEE 802.11-OFDM symbols. 16 μs; and
3) SIG: the signal field OFDM symbol that conveys 2 important information: the MCS & the data set duration of the following IEEE 802.11p OFDM symbols. 8 μs.
4) DATA: this section may be either omitted, partially or fully transmitted. This section may provide information such as the MAC header which may convey the 802.11 OCB (Outside the Context of a Basic Service Set identifier) flag (dot11OCBActivated)
5) padding: this section may be either omitted, partially or fully transmitted. The padding may be made out of energy signals or WGN noise, and can be either be band-limited to the subsequent LTE symbols (ex: a few subchannels), or follow the bandwidth of the 'channel reservation token (8.125 MHz).

Information that is meaningful for WiFi stations to understand this data set as a valid V2X data set may be located in the MAC header, which is positioned at the beginning of the MAC header. As such, the amount of data symbols to be transmitted may be rather low, such as 2 to 3 OFDM symbols with QPSK 1/2, conveying ~29-33 bytes, and enough to convey the IEEE 802.11 OCB (Outside the Context of a Basic Service Set identifier) flag (dot11OCBActivated) that is located in the Management information base (MIB). This may lead to a duration of X=16-24 μsec.

The duration X can take many values depending on the MCS chosen, the channel bandwidth, and the last symbol of the previous subframe can also be partly used, and "padding" fills the remainder of the LTE OFDM worth of time (72 usec) by WGN noise. That part of the 1st OFDM symbol can either be band-limited to the subsequent LTE symbols (e.g., a few subchannels), or follow the bandwidth of an inserted just before.

Figure 4:
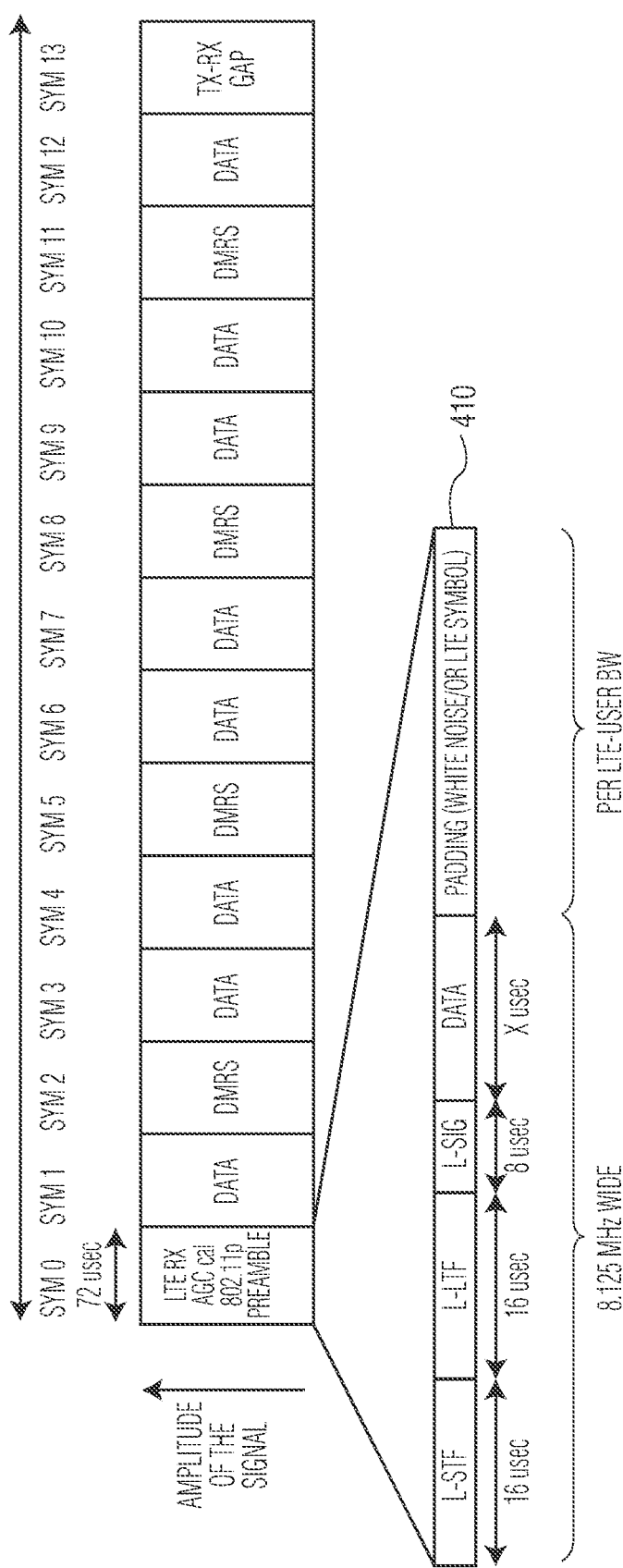
FIG. 4 shows an LTE-V2X subframe view, as may be implemented in accordance with the present disclosure.

FIG. 4 shows an LTE-V2X subframe view, with an inserted IEEE 802.11 data set 410 in place of the 1st OFDM symbol (Sym 0). The IEEE 802.11p data set is used by the LTE-V2X users to send a signal towards the WiFi stations, such as "this channel is in-use for V2X, please vacate." With this data set, LTE-V2X may make a reservation of the channel for LTE-V2X purposes. Such an inserted data set may be sent by all LTE-V2X users. Receivers of these messages receive a plurality of the same message, therefore being able to decode it successfully. The IEEE 802.11p data set may be formed as a regular message for a 10 MHz channel, being 8.125 MHz wide, while the rest of the subframe may follow the LTE-V2X frequency allocation.

FIG. 5 shows a multiple-user LTE-V2X subframe view, as may be implemented in accordance with one or more embodiments. The subframe view is depicted from the perspective of three transmitter LTE stations at 501, 502 and 503, and an LTE receiver station at 504. The transit power (in dBm) of an inserted packed as noted herein may be identical to the transmit power of a (valid) subsequent LTE OFSM symbol. The transit power (in dBm) of the padding may also be identical to the transmit power of the rest of the message. Since the LTE-V2X is a synchronous and multiple users access scheme network, the LTE-V2X stations have stringent synchronization requirements (e.g., in the range of 0.1 PPM). Thus, the messages 501, 502 and 503 originating from different LTE-V2X stations may be sent with very high time-accuracy. Since the IEEE 802.11p part of the LTE-V2X message is a predefined sequence known by all LTE-V2X transmitters, the LTE-V2X stations will be sending the exact same copy of IEEE 802.11p part and the data set, and thus the multiple copies will be adding up constructively from the receiver perspective. Thus, the case of multiple ITS-G5 headers being sent in the same subframe can be viewed as an SFN (Single Frequency Network) situation (like transmission of MBSFN in LTE, or DVB-T for example).

In case the C-V2X stations are not loading the IEEE 802.11p data set from a prerecorded memory, a predefined scrambling seed may be used for encoding of the IEEE 802.11p DATA section, to ensure the multiple copies will be adding up constructively from the receiver perspective.

Disclosed herein is A method comprising: generating a set of signals including data configured in accordance with a first protocol and data configured in accordance with a second protocol; and communicating the set of signals over a wireless channel, including using the data corresponding to the first protocol to communicate with receivers operating in accordance with the first protocol, and using the data corresponding to the second protocol to communicate with receivers operating in accordance with the second protocol In one or more embodiments, generating the set of signals includes modifying signals that are to be communicated using the second protocol to include a communication data set in accordance with the first protocol.

In one or more embodiments, wherein generating the set of signals includes adding, to a communication configured in accordance with the second protocol, a data set configured in accordance with the first protocol, the data set including information allowing receiver circuitry, which is configured to decode signals of the first protocol and unable to decode signals of the second protocol, to decode the data set configured in accordance with the first protocol and operate in accordance therewith.

In one or more embodiments, generating the set of signals includes inserting, in the data set configured in accordance with the first protocol, information that directs receivers operating in accordance with the first protocol to defer channel use to communications including data configured in accordance with the second protocol.

In one or more embodiments, generating the set of signals includes retrieving a stored version of the data configured in accordance with the first protocol and inserting that stored version into signals configured in accordance with the second protocol.

In one or more embodiments, the steps of generating and communicating are carried out within logic circuitry and communication circuitry, the logic circuitry providing data for the set of signals by inserting a data set of data configured in accordance with the first protocol into a set of data sets of data configured in accordance with the second protocol.

As noted above, an IEEE 802.11p data set may be inserted in the last OFDM symbol of the previous subframe and in 1st OFDM symbol of LTE-V2X. In the event of the inserted data set duration being larger than 1 OFDM symbol worth of time, it may be extended by starting it earlier.

As examples, the Specification describes and/or illustrates aspects useful for implementing the claimed disclosure by way of various circuits or circuitry which may be illustrated as or using terms such as blocks, modules, device, system, unit, controller, logic circuit, communications circuitry, receiver, transmitter and/or other circuit-type depictions (e.g., reference numerals 110, 120 and 130 of FIGS. 1 and 210, 212, 220, 230, 240, 250, 260 and 270 may depict a block/module as described herein). Such circuits or circuitry may be used together with other elements to exemplify how certain embodiments may be carried out in the form or structures, steps, functions, operations, activities, etc. As examples, wherein such circuits or circuitry may correspond to logic circuitry (which may refer to or include a code-programmed/configured CPU), in one example the logic circuitry may carry out a process or method (sometimes "algorithm") by performing signal generation and effecting communication thereof (e.g., by operating with communication circuitry). Such logic circuitry may carry out a process or method by performing these same activities/operations (e.g., and/or as in the claims).

For example, in certain of the above-discussed embodiments, one or more modules are discrete logic circuits or programmable logic circuits configured and arranged for implementing these operations/activities, as may be carried out in the approaches shown in FIGS. 1-6. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described above is used by the programmable circuit to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first" protocol and a "second" protocol, the adjectives "first" and "second" are not used to connote any description of any related structure or to provide any substantive meaning; rather, such adjectives are merely used for English-language antecedence to differentiate one such similarly-named aspects.

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Further, a variety of types of communications may be effected with respective communication protocols in which a data set (or other data portion) of a first protocol is inserted in to communications of a second protocol for ensuring communications with receivers of the first protocol. Such modifications do not depart from the true spirit and scope of various aspects of the disclosure, including aspects set forth in the claims.

What is claimed is:

1. An apparatus comprising:
   communication circuitry to communicate signals according to a first protocol, over a wireless channel;
   logic circuitry configured and arranged with the communication circuitry to:
     generate a set of signals including first data configured in accordance with the first protocol and including second data configured in accordance with a second protocol, the first protocol is a synchronous protocol and the second protocol is an asynchronous protocol, the second data including an 802.11 packet, the 802.11 packet including a legacy short training field, a legacy long training field, a signal field, and data; and
     communicate the set of signals as a sequence of subframes over the wireless channel, each subframe including a plurality of OFDM symbols, one or more subframes of the sequence including the first data corresponding to the first protocol for communicating with receivers operating in accordance with the first protocol, and one or more of a first OFDM symbol of a subframe of the sequence or a last OFDM symbol of a previous subframe of the sequence including the second data to communicate with receivers operating in accordance with the second protocol; and
     wherein the logic circuitry is configured and arranged with the communication circuitry to communicate at least a first portion of the second data in the last OFDM symbol of a subframe of the sequence and at least a second portion of the second data in the first OFDM symbol of a next subframe of the sequence.

2. The apparatus of claim 1, wherein the 802.11 packet is smaller than an OFDM symbol.

3. The apparatus of claim 1, wherein:
   the first protocol comprises a C-V2X protocol;
   the second protocol comprises a Wi-Fi signal protocol;
   the logic circuitry is configured and arranged with the communication circuitry to communicate the set of signals by communicating C-V2X signals on the wireless channel using the C-V2X protocol; and
   the logic circuit is configured and arranged with the communication circuitry to communicate the C-V2X signals with at least one symbol comprising the 802.11 packet decodable by receivers operating on the Wi-Fi signal protocol.

4. The apparatus of claim 1, wherein the second data corresponding to the second protocol includes information that instructs the receivers using the second protocol to vacate the wireless channel, therein providing access to the wireless channel for communicating the first data corresponding to the first protocol.

5. The apparatus of claim 1, wherein the logic circuitry is configured and arranged with the communication circuitry to communicate the set of signals to communication stations over a different communication channel and utilizing the second protocol, without inserting the first data corresponding to the first protocol.

6. The apparatus of claim 1, wherein the 802.11 packet further includes padding including data signals that are band-limited to one of a subsequent symbol or a channel reservation token of the first data.

7. The apparatus of claim 1, wherein the logic circuitry is configured and arranged with the communication circuitry to include, in communications using the first protocol, the second data configured in accordance with the second protocol, the second data including information allowing receiver circuitry, which is configured to decode signals of the second protocol and unable to decode signals of the first protocol, to decode the second data configured in accordance with the second protocol and operate in accordance therewith.

8. The apparatus of claim 1, wherein the logic circuitry is configured to include, in the first data configured in accordance with the first protocol, the second data including information that directs receiver circuitry to defer channel use to communications including the first data configured in accordance with the first protocol.

9. The apparatus of claim 1, wherein the logic circuitry is to generate a set of signals including second data configured in accordance with the second protocol by retrieving a stored version of the second data configured in accordance with the second protocol.

10. The apparatus of claim 1, wherein the logic circuitry is configured to limit a first amplitude of the first OFDM symbol of the subframe to be equal to a second amplitude of one or more subsequent OFDM symbols of the subframe.

11. A method comprising:
generating a set of signals including a sequence of subframes, each subframe including a plurality of OFDM symbols, one or more of the subframes of the sequence including first data configured in accordance with a first protocol and second data configured in accordance with a second protocol, the second data including an 802.11 packet, the 802.11 packet including a legacy short training field, a legacy long training field, a signal field, and data; and
communicating the sequence of subframes over a wireless channel, one or more OFDM symbols of a subframe including the first data corresponding to the first protocol to communicate with receivers operating in accordance with the first protocol, and including one or more of a first OFDM symbol of the subframe or a last OFDM symbol of a previous subframe including the second data corresponding to the second protocol configured to communicate with receivers operating in accordance with the second protocol; and
wherein the 802.11 packet further includes padding including data signals that are band-limited to one of a subsequent symbol or a channel reservation token of the first data.

12. The method of claim 11, wherein:
the first protocol comprises a C-V2X protocol;
the second protocol comprises a Wi-Fi signal protocol; and
communicating the set of signals includes communicating the first data including C-V2X signals on the wireless channel using the C-V2X protocol and including the second data including a Wi-Fi data set within the one or more of the first OFDM symbol or the last OFDM symbol, the Wi-Fi data set decodable by receivers operating on the Wi-Fi signal protocol.

13. The method of claim 11, wherein communicating the set of signals includes communicating the second data in the second protocol that instructs the receivers operating in accordance with the second protocol to vacate the wireless channel, therein providing access to the wireless channel for communicating the first data corresponding to the first protocol.

14. The method of claim 11, wherein communicating the set of signals includes communicating at least a first portion of the second data in the last OFDM symbol of a subframe of the sequence and at least a second portion of the second data in the first OFDM symbol of a next subframe of the sequence.

15. The method of claim 11, further including communicating a set of signals consisting of the second data configured in accordance with the second protocol over a different communication channel with receivers operating in accordance with the second protocol.

16. The method of claim 11, wherein generating the set of signals including the second data configured in accordance with the second protocol further comprises modifying signals to be communicated using the first protocol to include a communication data set including the second data in accordance with the second protocol.

17. The method of claim 16, wherein modifying signals to be communicated using the first protocol to include a communication data set including the second data comprises modifying signals to be communicated using the first protocol to include the second data including information allowing receiver circuitry configured to decode signals of the second protocol and unable to decode signals of the first protocol to decode the data set configured in accordance with the second protocol and operate in accordance therewith.

18. The method of claim 11, wherein generating the set of signals including the sequence comprises generating the set of signals including the second data configured in accordance with the second protocol to include information that directs receiver circuitry configured to decode signals of the second protocol to defer use of the wireless channel to communications including data configured in accordance with the first protocol.

19. The method of claim 11, wherein generating the set of signals including the sequence further comprises retrieving a stored version of the second data configured in accordance with the second protocol.

20. The method of claim 11, further comprising limiting a first amplitude of the first OFDM symbol of the subframe to be equal to a second amplitude of one or more subsequent OFDM symbols of the subframe.

* * * * *